No. 783,393. Patented February 21, 1905.

UNITED STATES PATENT OFFICE.

GUSTAVE TÜSCHEL, OF ODESSA, RUSSIA.

PROCESS OF MAKING VARNISH.

SPECIFICATION forming part of Letters Patent No. 783,393, dated February 21, 1905.

Original application filed July 8, 1904, Serial No. 215,702. Divided and this application filed September 26, 1904. Serial No. 225,970.

*To all whom it may concern:*

Be it known that I, GUSTAVE TÜSCHEL, manufacturer, a subject of the Russian Emperor, residing at Odessa, Russia, have invented a new and useful Process of Making Varnish; and I do hereby declare the following to be a full, clear, and exact description of the same.

My present invention consists in an improved process of making a varnish which when applied to articles of furniture or the like gives the same a durable polish, resisting even the influence of the weather.

My improved varnish is preferably applied upon surfaces which are previously grounded or primed in accordance with the process of grounding described in my application, Serial No. 215,702, dated July 8, 1904.

My improved process is as follows: One hundred and twenty grams of red accroide-resin are boiled in water and the red color separated, whereupon the accroide is dried for twenty-four hours and dissolved in a suitable vessel with the addition of a mixture of thirty grams of gum-mastic, sixty grams of sandarac, forty grams of ground Manila copal, and fifty grams of Venetian turpentine. This mass is melted and then poured out upon a marble slab. When the mixture has cooled off, it is dried for twenty-four hours and dissolved by shaking it in one thousand grams of methylated spirit of 0.950 specific gravity. After the mixture has been allowed to stand for three days it is filtered and receives an addition of ten grams of ether. The varnish obtained in this manner is adapted to serve for varnishing all kinds of high-class furniture by making use of cotton wool or lint.

When it is desired to impart to the furniture or the like a black varnish, an addition is made to the mixture of twenty grams of black and three grams of blue anilin, whereas the mahogany is obtained with an addition of thirty grams of Bismarck brown.

Having fully described my invention, what I claim, and desire to secure by Letters Patent, is—

A process of making a varnishing material for surfaces of furniture and the like, consisting in boiling in water red accroide-resin, in then pouring off the liquid and drying the resin, in subsequently mixing it with gum-mastic, sandarac, Manila copal and Venetian turpentine and melting it over the fire, in pouring out the mixture upon a marble slab and dissolving it in methylated spirit after it has cooled off and dried, in filtering the mixture thus obtained and adding thereto a slight quantity of ether.

In testimony whereof I have signed my name to this specification in the presence of two subscribing witnesses.

GUSTAVE TÜSCHEL.

Witnesses:
  HERBERT D. JAMESON,
  FREDK. L. RAND.